Oct. 14, 1941.  J. D. MURPHY  2,258,904
ANIMAL TRAP
Filed Oct. 5, 1940  2 Sheets-Sheet 1
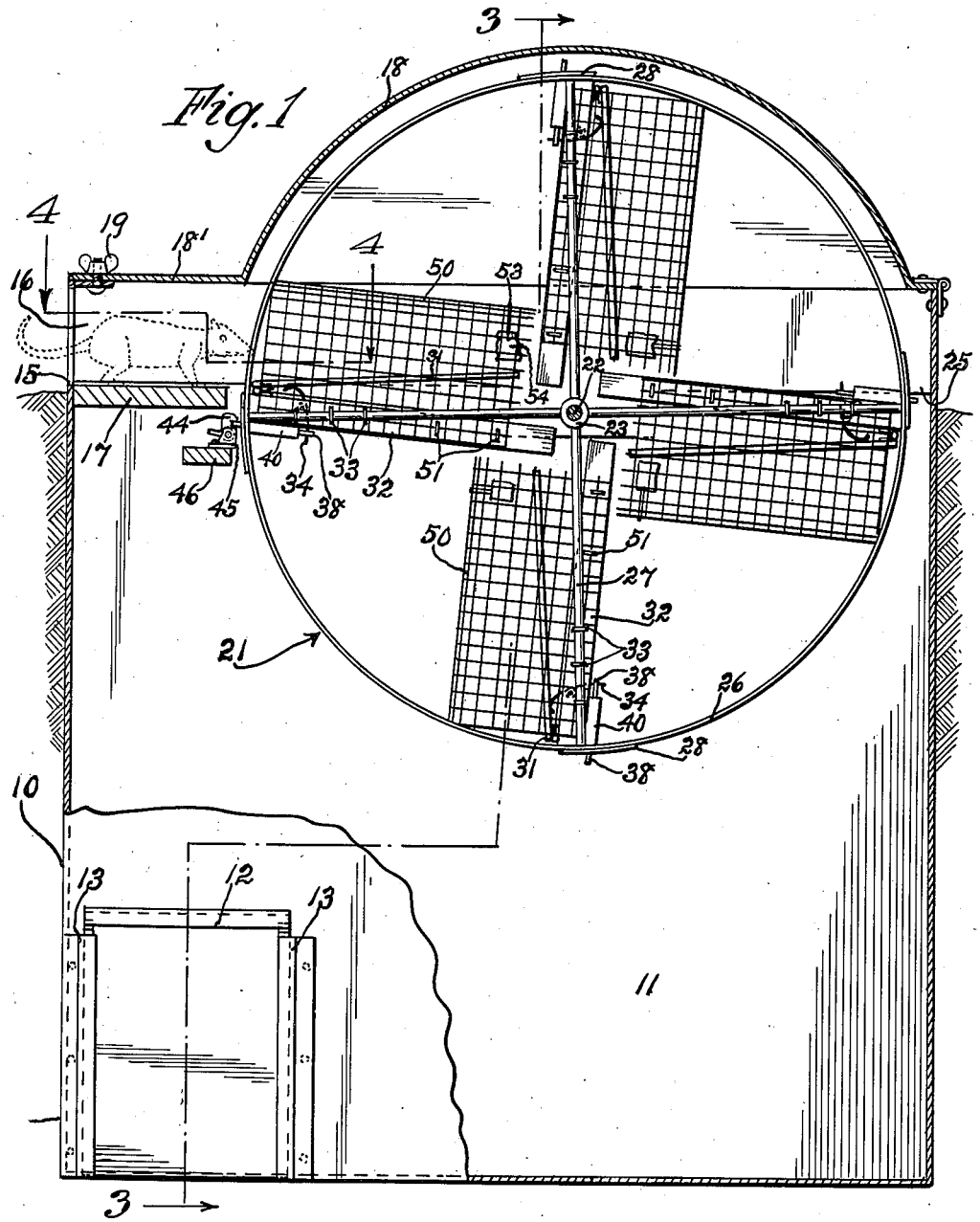
Inventor
John D. Murphy
by J. Daniel Stuwe
Attorney.

Oct. 14, 1941.   J. D. MURPHY   2,258,904
ANIMAL TRAP
Filed Oct. 5, 1940   2 Sheets-Sheet 2
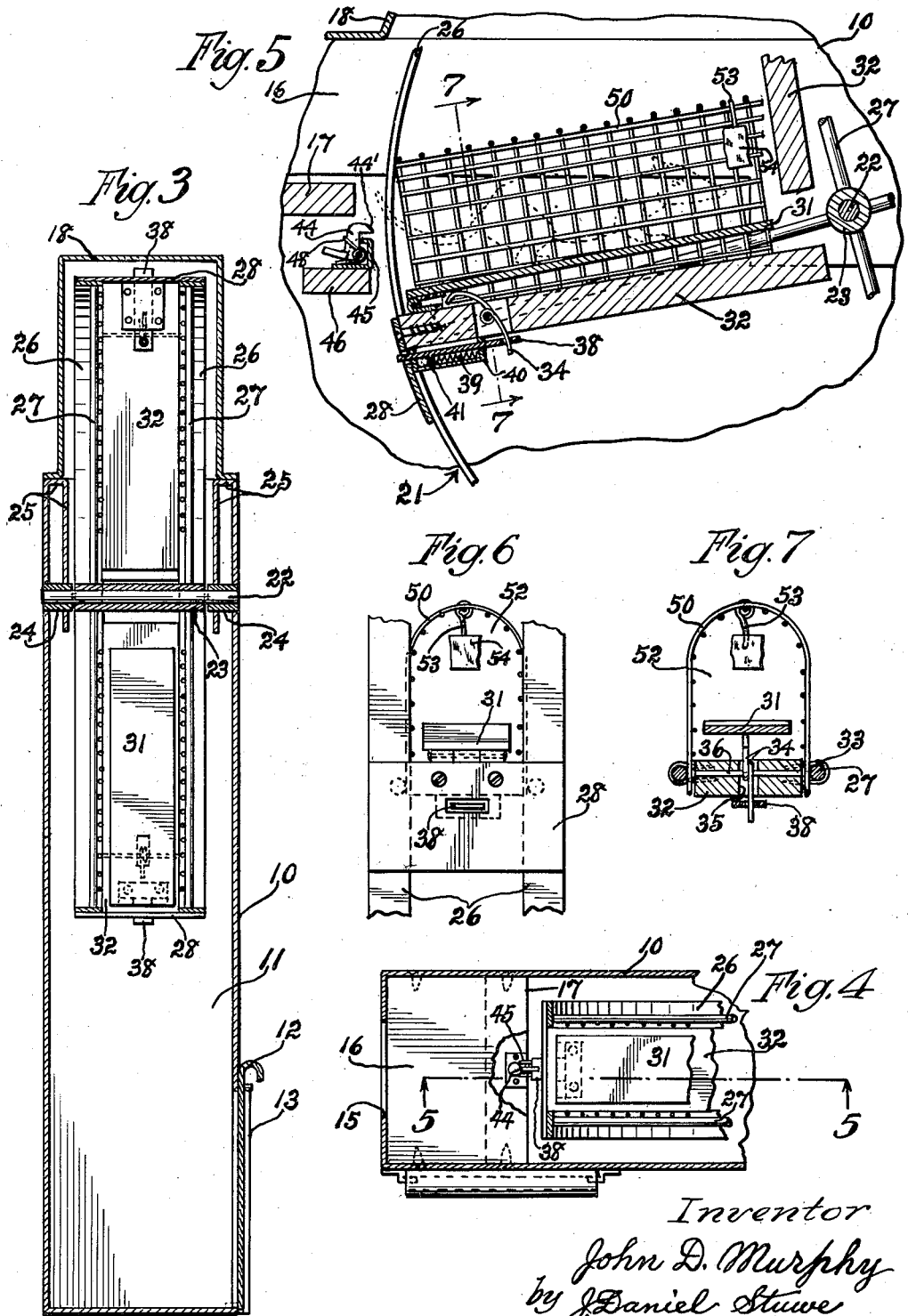
Inventor
John D. Murphy
by J. Daniel Stuwe
Attorney.

Patented Oct. 14, 1941

2,258,904

UNITED STATES PATENT OFFICE 2,258,904

ANIMAL TRAP

John D. Murphy, Chicago, Ill.

Application October 5, 1940, Serial No. 359,818

5 Claims. (Cl. 43—72)

This invention relates to improvements in animal traps.

One of the main objects of this invention is to provide an improved trap which is entirely automatic, and wherein the animal itself will, by its passage into the trap, release the trip mechanism for operating the trap and will also automatically reset the trap ready for its next operation.

Another object of this invention is to provide a durable and efficient but simple and economical trap construction, including a small movable chamber for receiving an animal, and a large chamber for confining a plurality of animals, and also having means automatically actuated by the entering animal, whereby the small chamber moves and said animal is released therefrom to the large chamber and the trap is at the same time automatically reset in its operative position, so as to operate repeatedly without requiring any attention.

A more particular object of this invention is to provide a trap comprising rotary means including several individual cages, also a housing for confining a plurality of animals, and trip means associated with the cages, the same being released thru the weight of the animal as it enters a cage, whereupon said member is automatically set in rotation so as to drop the animal from the cage into the casing and prevent its escape, and whereby at the same time the trip means is actuated to reset the trap and hold the succeeding cage in its operative position.

These and various other objects and advantages are attained with this invention, as will become apparent from the following description, taken in connection with the accompanying drawings wherein this invention is shown in its preferred form, it being evident that other forms of construction and modifications may be adopted for carrying out the objects and purposes of this invention.

In the drawings:

Fig. 1 is a partial vertical section and partial side elevation of this invention, shown in its preferred form of construction.

Fig. 2 is a fragmentary view showing the entrance to the trap.

Fig. 3 is a vertical sectional view, taken on line 3—3 of Fig. 1.

Fig. 4 is a partial horizontal sectional view, taken substantially on line 4—4 of Fig. 1.

Fig. 5 is a partial vertical sectional view on an enlarged scale, taken on line 5—5 of Fig. 4.

Fig. 6 is a partial end elevational view showing a cage with its trip means.

Fig. 7 is a cross-sectional view of the cage and trip means, taken on line 7—7 of Fig. 5.

This invention is shown herein in the form and size more particularly adapted for catching rats, mice, and the like; but it is likewise adapted to be readily made of a larger and stronger construction, for catching many kinds of larger animals.

The form disclosed herein comprises a casing or housing 10, the lower part of which provides a chamber 11 adapted for receiving and confining a plurality of the trapped animals therein. This housing is preferably constructed of durable sheet metal, which is sufficiently strong and smooth to prevent the trapped animals from climbing up its walls and from gnawing thru the same. A door or gate 12 is preferably provided on chamber 11, for removing the trapped animals; and this may economically consist of a gate which fits closely but slidably in channel means 13 on the casing.

An entrance opening 15 is provided adjacent the upper part of the casing, and a passageway or entrance channel 16 including a fixed platform 17 extends from said opening into the casing, as best shown in Fig. 1, said channel being of the proper size to admit therein the animal to be captured. A cover 18 is hinged on the casing and includes a portion 18' forming the top for said channel 16; while means 19 is provided for holding the cover releasably in position, thus affording access to the casing.

The trapping means provided herein comprises a rotary member or wheel means 21 which is rotatably mounted in the casing, by the use of an axle or shaft 22 extending thru the hub 23 of the wheel and its ends bearing in sleeves 24 mounted in the doubled or turned-over upper part 25 of the casing. This wheel includes a pair of circular bands or rims 26 and two sets of spokes 27 securing the rims upon the hub 23, while straps 28 secure said bands 26 together.

The trip means provided herein comprises a plurality of trip platforms or treadles 31, each being hinged at its outer end upon a supporting bar 32, both extending substantially radially of the wheel, and each bar is secured between two of the spokes 27, by means of staples 33 or the like.

An operating arm 34 extends thru an opening 35 in the bar 32 and is pivoted by a pin 36 in said bar, while the upper end of the arm engages treadle 31 adapted to be actuated thereby. The lower end of arm 34 engages a bar or latch 38 and retracts said latch whenever the treadle 31 is depressed, as indicated in Fig. 5 of the drawings. A spring 39 in a housing 40 engages a lug 41 on latch 38 and returns or extends said latch to its outer position when the weight on the treadle is removed and it returns to its normal position. Said spring 39 is of substantial strength, for moving arm 34 and raising treadle 31 to release position.

A hook or catch 44 is pivoted in a bracket 45 being thereby mounted on a cross-bar 46 secured in the casing, beneath the platform 17; and a spring 48 draws the catch 44 into its holding position, thus being adapted to receive and to hold the latch bar 38 safely in place between catch 44 and bracket 45, as shown in Figs. 1 and 4.

A curved wall member 50 is mounted over each treadle 31 and is secured to the bar 32, with staples 51 or the like, and it preferably consists of strong wire mesh, so as to provide a trap chamber or cage 52 for receiving therein the animal which advances from the entrance channel 16, substantially as indicated in Fig. 5. Hook means 53 is provided at the inner end of chamber 52 for receiving suitable bait material 54 thereon.

In operation, one of the cages or chambers 52 has its latch 38 held in place between catch 44 and bracket 45, so that the cage registers with the entrance channel 16 and treadle 31 is substantially level with platform 17, as indicated in Fig. 1. Thereupon, as the animal advances on the treadle 31 to bait 54, said treadle is depressed to actuate arm 34 and retract latch 38 releasing it from bracket 45; whereupon the cage with the animal descends, as indicated in Fig. 5, and as the animal endeavors to back up and withdraw from this moving cage it simply drops into the confining chamber 11 in the lower part of the casing. Upon the partial rotation of the wheel the following latch 38 slides downwardly along the curved nose 44' of catch 44 thereby retracting said catch and it then comes to rest upon bracket 45, whereby catch 44 snaps in position above the latch; thus firmly and positively holding the trap in position, with the associated cage 52 registering with the entrance chamber 16, ready for the next trapping operation. In case the animal in the preceding and lowermost cage has clung to the walls of said cage, it has no means of escape upwardly, and it has been found that it quickly tires and promptly drops from the cage into the casing, there joining its previously captured companions.

This trap is simple and durable and comparatively inexpensive in construction and it is entirely automatic in resetting itself with each operation; while it is furthermore adapted to catch a considerable number of animals without requiring any attention or any rebaiting of the trap, as the bait is not consumed and is rarely touched by an animal before the latch is released and the animal is dropped into the confining chamber. The animals can be drowned or killed, and can be readily removed thru outlet door 12; and the trap can be placed alongside a porch or step, or can be set into an opening in the ground, to locate the entrance 15 in a conveniently accessible position for the animals.

I claim:

1. A trap comprising a casing the lower part of which provides a chamber for confining trapped animals, wheel means rotary on the upper part of the casing and containing a plurality of cages mounted in succession thereon, an entrance channel on the casing wherewith either of the cages is adapted to register, and trip means including a treadle and latch means on each cage, said latch means being released by the animal on the treadle in the cage, whereupon the wheel means rotates to drop the animal from that cage into the confining chamber, and the latch means on the following cage functions automatically to secure it in its operative position.

2. A trap comprising a casing the lower part of which provides a chamber for confining a plurality of animals, a wheel mounted to rotate on the upper part of the casing and containing a series of cages each extending substantially radially of the wheel, an entrance channel stationary on the casing, with which each of the cages is adapted to register in turn, and trip means, including a treadle and a spring-actuated latch in each cage and also a catch in the casing to engage a latch, the latter being actuated by the animal on the treadle, whereby the latch is released from the catch and the wheel rotates to drop the animal from said cage into the confining chamber, and the latch of the following cage automatically engages the catch for securing said following cage in register with the entrance channel to reset the trap.

3. A trap comprising a casing adapted to retain a plurality of trapped animals, rotary means in the casing including a series of cages, an entrance channel on the casing wherewith either cage is adapted to register, trip means including treadle means with releasable means associated with each cage and released by the weight of the animal on the treadle means in the cage, means for holding bait at the inner end of each cage, substantially beyond reach of the animal even when it has entered the cage, whereupon the cage with the animal promptly move downwardly to drop the animal into the casing before it has removed said bait from the holding means, and the following cage and its trip means move into operative position.

4. A trap comprising a casing the lower part of which provides a chamber for confining trapped animals, wheel means rotary on the upper part of the casing and containing a series of cages spaced around the same, an entrance channel on the casing wherewith either of the cages is adapted to register, means for holding bait in the inner end of each cage, and trip means including a catch on the casing and also a treadle and latch means in each cage, the latch being released by the animal while on said treadle, whereupon the wheel means with its cages rotates to drop the animal from the cage into the confining chamber before it has removed the bait from the holding means, while the latch means on the following cage functions automatically to secure it in its operative position, whence the trap will function repeatedly and for an extended length of time without further attention.

5. A trap comprising a metal casing the lower part of which provides a chamber for confining a plurality of trapped animals, a wheel rotatably mounted in the upper part of the casing and including a pair of spaced wheel means having a series of spaced-apart cages mounted therebetween, each cage extending substantially radially of the wheel, an entrance channel stationary on the casing, with which each of the cages is in turn adapted to register, means for holding bait in the inner end of each cage, and trip means including a spring-held latch and a treadle in each cage for releasing the latch, also a catch movably supported on stationary means in the casing adapted to engage a latch and hold it with the trap in a stationary operative position, whereby an animal which has passed from the entrance channel onto the adjoining treadle will release the latch from the catch and set the wheel in rotation to drop the animal from the cage into the lower chamber, before it has eaten the bait, and the latch of the following cage will automatically engage the catch thereby securing said cage in register with the entrance channel to reset the trap, whence this trap will function repeatedly without further attention.

JOHN D. MURPHY.